(No Model.)   
3 Sheets—Sheet 1.

S. C. ASHMORE.
POULTRY HOUSE.

No. 603,121.  Patented Apr. 26, 1898.

WITNESSES:

INVENTOR
S. C. Ashmore.
BY
ATTORNEYS.

(No Model.) 3 Sheets—Sheet 2.

S. C. ASHMORE.
POULTRY HOUSE.

No. 603,121. Patented Apr. 26, 1898.

WITNESSES:
Paul Johst
Wm. F. Patton

INVENTOR
S. C. Ashmore
BY
[signature]
ATTORNEYS.

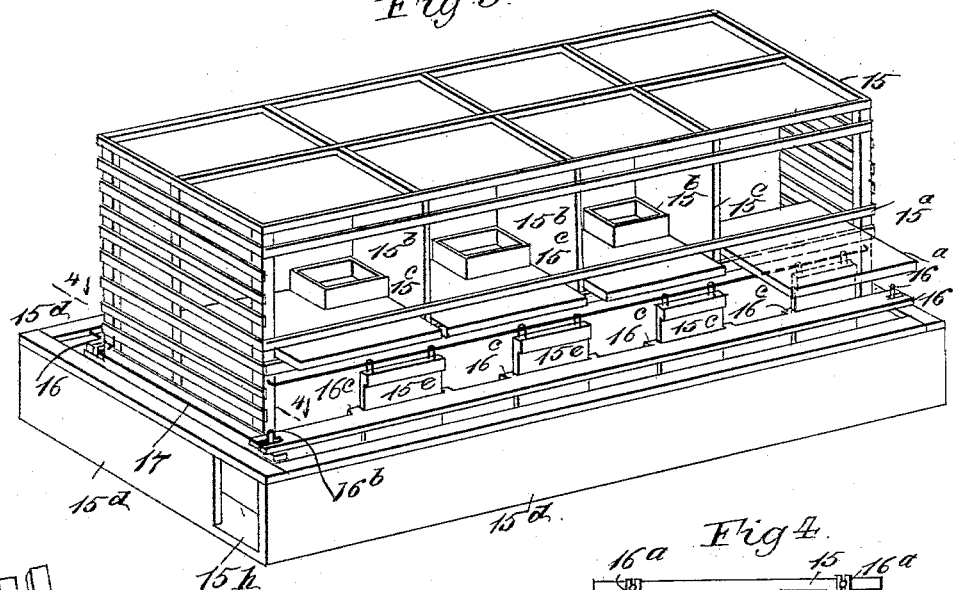

UNITED STATES PATENT OFFICE.

SAMUEL CLAIBORNE ASHMORE, OF CALEDONIA, MISSISSIPPI.

POULTRY-HOUSE.

SPECIFICATION forming part of Letters Patent No. 603,121, dated April 26, 1898.

Application filed February 26, 1897. Serial No. 625,192. (No model.)

*To all whom it may concern:*

Be it known that I, SAMUEL CLAIBORNE ASHMORE, of Caledonia, in the county of Lowndes and State of Mississippi, have invented a new and useful Improved Poultry-House, of which the following is a full, clear, and exact description.

This invention relates to improvements in poultry-houses, and has for its object to provide a novel, inexpensive, and convenient structure having nesting and hatching coops, a roosting-house connected with said coops, and runways leading to said coops, and which as a whole affords a safe commodious roosting-place for large or small hens or chickens, nests for laying hens or those that are hatching, and which provides complete and reliable protection for the fowls or their broods from the depredations of reptiles, animals, or thieves.

To these ends my invention consists in the construction and combination of parts, as hereinafter described, and indicated in the claims.

Reference is to be had to the accompanying drawings, forming a part of this specification, in which similar figures of reference indicate corresponding parts in all the views shown.

Figure 1:
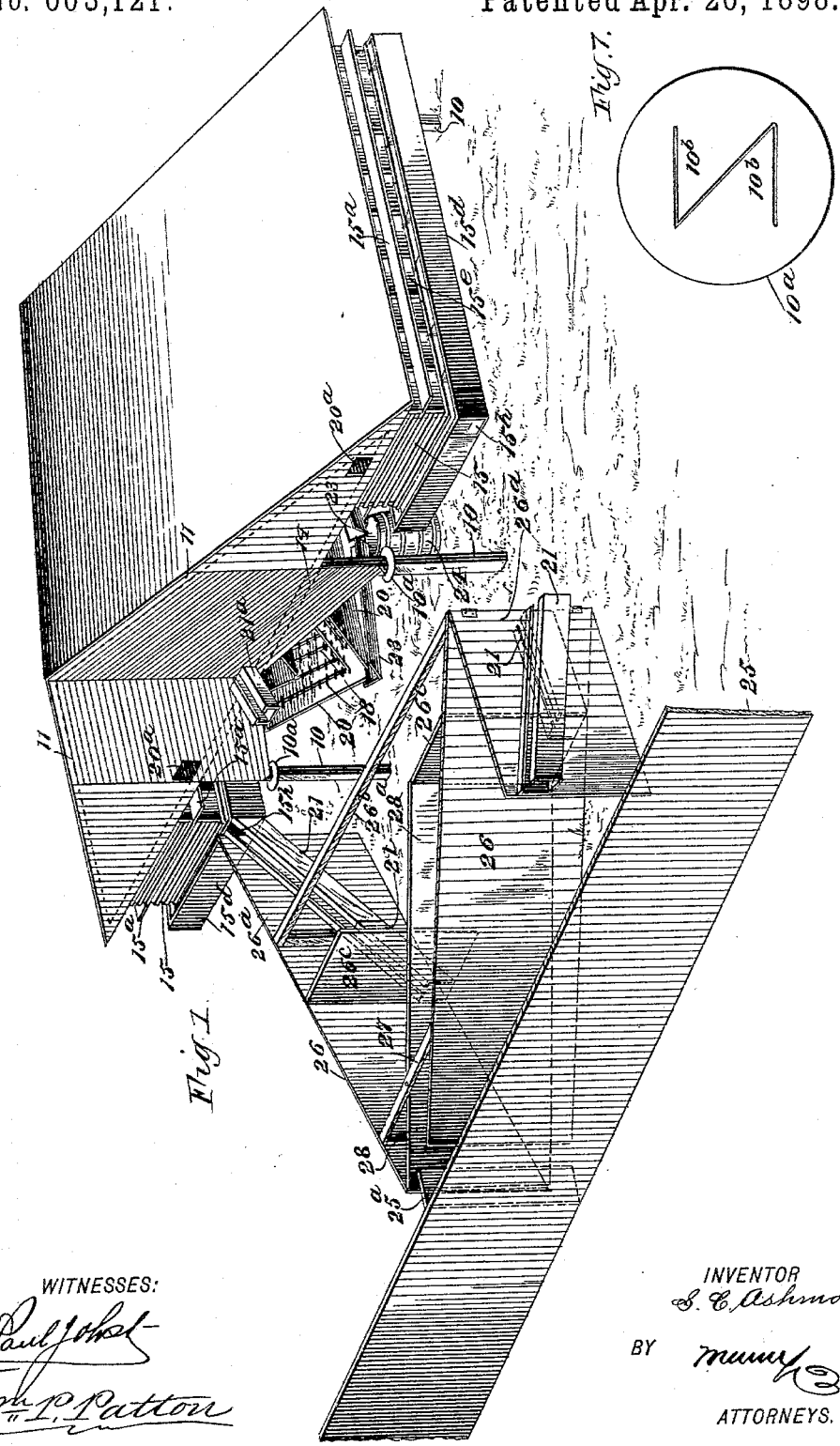
Figure 2:
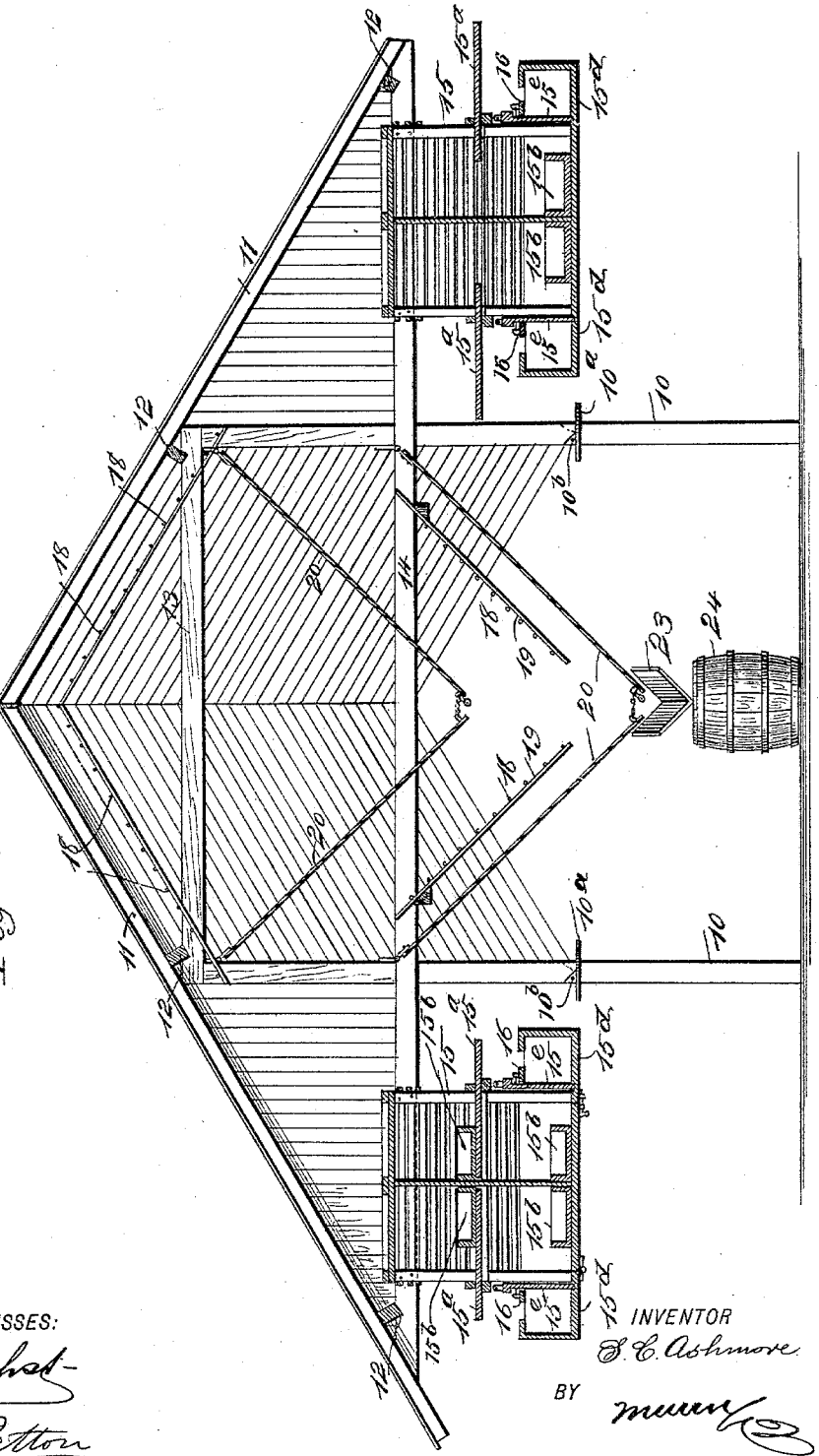

Figure 1 is a perspective view of the complete house and attached runways that afford access to the coops and roosting-building. Fig. 2 is an enlarged transverse sectional view of the improvement, showing interior parts of the same exposed by the removal of the front walls of the roosting-house and attached coops. Fig. 3 is an enlarged detached perspective view of one of the pair of coops that are features of the invention. Fig. 4 is a sectional plan view of one of the improved nesting-coops, taken on the line 4 4 in Fig. 3. Fig. 5 is an enlarged detached and broken detail of construction, showing the formation of a simple and effective locking device for the doors of the nesting-coop shown in Figs. 3 and 4. Fig. 6 is a detached perspective view in part of the trap-gates and runways provided as controlled approaches from the yard to the nesting-coops, and Fig. 7 is a detached plan view of a guard-plate for one of the four posts that afford support to the entire structure.

The roosting-house and pair of nesting-coops, which embody the main features of my invention, are supported on the four vertical posts 10, that are preferably made of substantial wooden squared timbers of a suitable length, which are embedded in the soil at their lower ends or may rest on the ground, they having such a height above the ground as will adapt them to receive the equally-sloped roof-supporting rafters 11, two of which are represented in Fig. 2, a sufficient number of said rafters being provided to afford a stable support for the roof proper, that is indicated in Fig. 1.

The rafters 11 are joined together by the stringers 12, that rest on the parallel transverse cap-sills 13 and roof tie-beams 14, and these cross-timbers that are provided in such numbers as are necessary for the production of a substantial structure are secured at the front and rear ends of the building on the posts 10, as shown in Fig. 2. The length and degree of spreading divergence of the rafters 11 at their lower ends are so proportioned that a considerable overhang for the roof is provided outside of the posts 10, and from the tie-beams 14 the similar nesting-coops 15 are hung, these being sufficiently removed from the posts to prevent access thereto by predaceous animals or snakes that may climb up the posts 10. As a further protection each post is furnished with a sheet-metal disk $10^a$, that projects in a horizontal plane from said posts at a proper height from the ground, and by its radial projection forms a secure barrier against the upward progress of small animals that usually prey on fowls and their young.

Preferably the disk-like guard-plates $10^a$ are formed as indicated in Fig. 7, each consisting of a circular metal plate having a Z-shaped slit cut in it, which will allow two V-shaped integral flanges $10^b$ to be turned up and produce a square hole for the reception of the post, whereon the flanges may be nailed when the disk is in proper position on said post.

The nesting-coops 15 each comprise a rectangular slatted frame that is of stable construction and has a transversely-central longitudinal partition formed in it which extends upright from the base to the roof, so as to form two equal nest-sections, and preferably these sections are divided by a floor-piece 15$^a$—that is, the bottom wall of an upper tier of nests 15$^b$, access to which is had from the outer side, as represented in Fig. 3—said pieces being either made movable or stationary. Below the floor-pieces 15$^a$ another row of nests 15$^b$ is provided, and, as shown in Figs. 3 and 4, nest-compartments are produced above and below in the coop-sections of both of the coops 15 by the introduction of evenly-spaced partition-walls 15$^c$. The bottom wall of each of the coops 15—that is, the bottom of the lower tier of nests—is preferably hinged at one side edge to permit it to be swung down and permit access to the interiors of said coops for whitewashing them or otherwise cleansing the same, slide-bolts or other means being also provided to detachably secure these bottoms in a closed position, as shown at the left side in Fig. 2.

On two sides and on the front end of each coop a gallery 15$^d$ is formed, the floors of which are on the same level with the bottom wall of the lower rows of nests in each coop, access to the said nests being provided through apertures in the outer side walls, that are protected by pendent sliding doors 15$^e$, the latter being hung from a longitudinally-extended rod on the side wall of each coop-section. The doors 15$^e$ are all retained in closed adjustment by a keeper-bar 16 for each coop-section of the coops 15, said bars having their ends longitudinally slotted of a proper length, as shown in Figs. 4 and 5, so as to permit similar ends of the same to have a locking engagement with the studs 16$^a$, which project from the rear end walls of the galleries 15$^d$, or staples may be used, so as to allow a lock to be applied, if this is desired.

The front slotted ends of the keeper-bars 16 have a sliding engagement with the staples 16$^b$ when they are placed to secure the doors 15$^e$ in closed condition, this being effected by the formation of the spaced ears 16$^c$ on the edges of the bars that lie nearest to the doors when the said bars are imposed on the open tops of the galleries 15$^d$ and interlocked with the studs and staples, as before mentioned, the ears then impinging the vertical edges of the doors in such a way as to prevent the doors from being slid to open the apertures they cover.

When the doors of the nests are to be secured by the keeper-bars 16, a transverse locking-bar 17 is utilized, as clearly shown in Fig. 5, this bar having a loop formed on one end to loosely encircle the staple on one side of the coop after the insertion of the opposite offset end portion of said locking-bar in the other staple, which will secure both keeper-bars in place by the use of one lock that is attached to the staple over the looped end of the locking-bar, as represented in the figure mentioned.

The galleries 15$^d$ have such a proportionate area in cross-section as will permit the free travel of small chickens in them, so as to leave or enter either of the nest-divisions in the lower rows of nests, these latter being especially adapted for the hatching and housing of small chicks until left to care for themselves by the old hen that is their foster mother. Preferably the tops of the galleries 15$^d$ are so contracted in width that the heads and necks only of grown chickens will be permitted to occupy the longitudinal openings in said tops, so that the larger chickens may not escape from these passages when driven into them.

In Fig. 4 will be seen a series of small gates 15$^i$, that are pivoted by one end of each to swing across the galleries, and thus partly or entirely close the latter opposite the fixed walls between the sliding doors of the coops. These little gates that occupy the interiors of the galleries are designed to be adjusted so as to open at any angle and if partly closed will permit the small chickens to enter the nests and bar larger ones from access thereto, a curved plate with pin-holes being preferably provided to facilitate such an adjustment of the gates by the insertion of a pin at any point needed to arrest the gate from being opened farther than said pin will allow, the removal of the pins enabling the gates to be entirely opened for the free passage of chickens of all sizes in the galleries.

The portion of the main structure that is between the upright posts 10 is designed to afford a cleanly, safe, and commodious roosting-house for poultry that may be fully or partly grown, and to this end is furnished with series of longitudinally-extended and suitably-spaced roost-poles 18, which are located in four rows, two of these rows being placed near the sloping roof of the structure and the other rows inclined downwardly and toward each other on a proper number of scantling-strips 19, that have their upper ends affixed on the tie-beams 14, as shown in Fig. 2. The roosting-house is further provided with two sets of guard-doors 20, which are hinged at their upper edges to the inner surfaces to the posts 10 and are extended from end to end of the roosting-house, each pair of doors being downwardly and inwardly inclined, so as to dispose their lower edges near to each other, which edges are held detachably connected by shackle chains and locks, as indicated in Fig. 2.

Below the upper set of guard-doors the lower tiers of roosts 18 are located, which are reached by the chickens through the holes 20$^a$, that are formed in the front end wall of the roosting-house, as shown in Fig. 1, these apertures being so near the ground that the chickens can readily fly into them, or, if desired, a special runway of cross-stripped planks (not shown) may be provided. At a central point between the holes 20$^a$ a larger aperture is formed in the front end wall of the roosting-house for the entrance of fowls that pass up through a runway 21$^a$, that is connected by its upper end to the building over the central aperture mentioned and reaches to the ground, said runway being shown in part in Fig. 1.

The preferred means for affording safe and convenient access to the galleries 15ᵈ for both coops 15 consist of the similar runways 21, these being rectangular troughs having longitudinal slots in their top walls to allow large fowls to protrude their heads and necks from the runways through said slats when traversing the runways, a similar formation being given to the central runway 21ᵃ. As shown, the runways 21 are so inclined that their lower ends will rest on the ground or on a proper foundation thereon, while the upper ends of said parts are projected near to the front ends of the side galleries 15ᵈ, opposite apertures formed in them, as shown at 15ʰ in Figs. 1 and 3.

There are two similar troughs 23 provided, which are hung below the lower pair of guard-doors 20 by their front and rear ends, the adjacent ends of these troughs being located near the longitudinal and transverse centers of the roosting-house and downwardly inclined a sufficient degree to permit excrement that falls onto the inclined doors to be scraped away or roll down into the troughs, and thence pass into a receptacle 24, which may be a barrel. (Shown in Figs. 1 and 2.)

An inclosing fence 25 (shown in part in Fig. 1) is provided to encompass the building and leave a spacious yard about it, the wall of said fence that is shown broken away at each end being located opposite the front ends of the roosting-house and attached coops and removed from the latter a sufficient distance to allow a peculiar structure to be introduced, which is termed a "chicken-trap," that extends from a point close to the fence-wall and has connection at the rear with the forward ends of the runways 21, as shown in Fig. 1. The trap shown in the figure named comprises two upright side walls 26, that are suitably separated at their forward ends, which are located near to the fence-wall 25, a sufficient space intervening these parts to permit fowls to pass between them from the inclosed yard at each side of the side walls 26, and from the fence-wall a dividing-wall 25ᵃ projects toward the roosting-house midway of the side walls, thus producing two passages for the fowls, one at each side of the dividing-wall. The side walls 26 are each divided into two portions, as are also the runways 21, the forward portions of the walls mentioned being made stationary, and the shorter front end portions of the runways secured to the inner faces of said stationary portions of these walls and properly inclined rearwardly and upwardly. The other parts 26ᵃ of the walls 26 are formed as gates, which are of such dimensions as will adapt them to fill the spaces that intervene the rear edges of the stationary portions of said side walls when adjusted to produce unbroken lines of fence at each side of the chicken-trap. The gates 26ᵃ are hung from upright posts that are at the rear ends of the stationary parts of the walls 26, and said posts may be braced by the transverse tie-beam 26ᵇ, so as to maintain their upper ends stable and upright.

The main portions of the runways 21 are affixed to the inner surfaces of the gates 26ᵃ, as shown in Fig. 1, these parts of the runways being correctly alined with the stationary portions of the same, so as to produce continuous runways that when the gates are closed, as indicated at the left side of Fig. 1, will afford an unbroken passage from the ground to the apertures 15ʰ of the galleries 15, it being apparent that when the gates 26ᵃ are swung away from the galleries all communication with the ground by means of the runways is cut off.

Similar wing-walls 26ᶜ are projected toward each other from the stationary sections of the side walls 26 at points near the posts and beam 26ᵇ in parallel with the latter, and, as indicated in Fig. 1, these wing-walls are apertured to receive the front ends of the runways 21, or the latter may have contact with the rear sides of the wing-walls opposite their apertures, so that fowls and small chickens may readily enter the runways from the trap.

A transverse brace-piece 27 is attached by its ends to the stationary portions of the side walls 26 at their top edges at a suitable distance from the division-wall 25ᵃ, and, as shown in Fig. 1, two gates 28 28ᵃ are pivoted to the brace-piece 27 near its transverse center, so that the gates may be swung together or separately. The shorter front gate 28 is of such a length that it may be adjusted to locate its front end near to the rear edge of the wall 25ᵃ and thus form a continuation of said division-wall. The other gate 28ᵃ is made of a correct length to permit its rear end to impinge the inner upright edge of either upright wing-wall 26ᶜ when it is swung toward it.

In service the trap shown in Fig. 1 will by a manifest lateral adjustment of the two gates 28 and 28ᵃ permit free passages to be afforded into each runway for large or small chickens, and in case it is desired the gate 28 may be swung so as to close the passage into either runway.

In Fig. 6 the trap is shown provided with two sets of gates 28 and 28ᵃ, which may in some cases be preferred, as it affords two direct passages from the yard into the runways when this is needed, such an adjustment of parts being represented in the figure mentioned.

It is claimed for the improvement as an entirety that it is a safe commodious roosting-place for large fowls, as by locking together the inclined doors at their lower edges access to the poultry is cut off, and thieves are thus prevented from readily entering the poultry-roosting house, and as the doors may be lowered to hang at the sides of the inclosure free access is afforded in this way for a thorough renovation and disinfecting of the roosting-house when this is needed.

The peculiar construction of the coops that are especially adapted for the accommodation of laying and hatching hens enables the safe securing of the hatching-nests from intrusion and permits the doors that afford access thereto to be all locked in closed adjustment or released in a quick easy manner.

The improved poultry-house can be constructed of any available materials, and the coops which have been described may be provided in duplicate, if this is desired.

Having thus fully described my invention, I claim as new and desire to secure by Letters Patent—

1. The combination, with an inclosed frame supported on upright posts, and having a roof thereon, and means for entering the inclosed structure, of pendent guard-doors inclining toward each other and forming a bottom wall for the structure, and roosts above said wall, substantially as described.

2. The combination, with an inclosed rectangular frame supported on upright posts, and having a roof thereon, and means for permitting entrance of fowls to the inclosed structure, of sets of pendent doors within the structure, normally inclined toward each other in pairs and secured together at their lower edges, and roosts between the sets of doors and above the upper set of doors, substantially as described.

3. A poultry-house provided with hinged guard-doors below the roosts, said guard-doors inclining toward each other and having their lower edges detachably connected together, substantially as and for the purpose set forth.

4. The combination, with a roosting-house, supported on posts and having a roof thereon, of a set of guard-doors hinged to the posts and normally inclined toward each other at their lower edges, means for detachably securing said edges of the doors together, and roosts in said house above the guard-doors, substantially as described.

5. The combination, with a roosting-house having hinged and inclined guard-doors as a bottom wall, and roosts above said doors, of troughs hung below the space between said doors, and a receptacle for excrement, arranged at the exits of the troughs, substantially as described.

6. The combination, with a frame supported on posts and having a roof thereon, of coops pendent from said frame and each having tiers of nests therein, sliding doors for protecting the lower tiers of said nests, galleries at the sides of the coops, and means of access for fowls to said galleries, substantially as described.

7. The combination, with a frame supported on posts, and having a roof thereon, and coops pendent from the frame and each having tiers of nests therein, of doors for the coops adapted to slide, keeper-bars for locking the doors, a locking-bar for the keeper-bars, and galleries at the sides of the coops, arranged to afford access to said coops, substantially as described.

8. The combination, with a frame supported on posts, of nesting and hatching coops hung at the sides of the frame, galleries at the sides of said coops, sliding doors on the coops, a securing device for said doors, and runways leading from the ground to the galleries, substantially as described.

9. The combination, with a frame supported on posts, of nesting and hatching coops pendent from the frame, sliding doors for said coops, a device arranged to secure all of said doors in closed adjustment, galleries at the sides of the coops and giving access to the nests, inclined runways leading to said galleries, each runway having a hinged section secured to a swinging gate, and a guard-trap connected with the lower ends of the runways, substantially as described.

10. In a poultry-house, substantially as described, the supporting-posts that sustain the structure removed from the ground, and sheet-metal guard-disks on said posts, each having a Z-shaped slit near its center to facilitate the attachment of said disk to a post, substantially as described.

11. In a poultry-house, the combination of hinged doors below the roosts and inclining toward each other, said doors being adapted to be locked together, and inclined troughs below the lower edges of the said doors, substantially as described.

12. In a poultry-house, a nesting and hatching coop provided with nest-compartments and having a gallery, the top of which is contracted, and longitudinally-slotted doors leading from the gallery to the nest-compartments, and means for locking the said doors, substantially as described.

13. In a poultry-house, a nesting and hatching coop provided with nest-compartments and having a gallery with contracted top, said top being longitudinally slotted, doors leading from the gallery to the nests, gates for the gallery, and means for adjustably holding the gates in position, substantially as described.

14. In a poultry-house, a nesting and hatching coop provided with nest-compartments, doors for said compartments, keeper-bars provided with lugs projecting on opposite sides of the doors, and a locking-bar for the keeper-bars, substantially as described.

15. The combination with a poultry-house, of a trap having hinged gates adjacent to the house, and runways leading to the house, said runways being in sections, one of which is secured to the hinged gates of the trap, substantially as described.

SAMUEL CLAIBORNE ASHMORE.

Witnesses:
R. H. CAMPBELL,
J. C. FOSTER.